United States Patent
Choi et al.

(10) Patent No.: US 8,005,304 B2
(45) Date of Patent: Aug. 23, 2011

(54) E8-VSB RECEPTION SYSTEM, APPARATUS FOR GENERATING DATA ATTRIBUTE AND METHOD THEREOF, AND APPARATUS FOR CHANNEL ENCODING AND METHOD THEREOF

(75) Inventors: In Hwan Choi, Seoul (KR); Kyung Won Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/901,978

(22) Filed: Oct. 11, 2010

(65) Prior Publication Data

US 2011/0026646 A1 Feb. 3, 2011

Related U.S. Application Data

(63) Continuation of application No. 11/286,511, filed on Nov. 22, 2005, now Pat. No. 7,840,077.

(30) Foreign Application Priority Data

Nov. 23, 2004 (KR) .................. 10-2004-0096358

(51) Int. Cl.
*G06K 9/36* (2006.01)
*G06K 9/46* (2006.01)
*H04N 7/12* (2006.01)
*H03C 1/52* (2006.01)
*H03D 1/24* (2006.01)

(52) U.S. Cl. .................. 382/232; 375/240.01; 375/270; 375/301; 375/321

(58) Field of Classification Search .................. 375/321, 375/240.01, 301, 270; 382/232
See application file for complete search history.

(56) References Cited

U.S. PATENT DOCUMENTS

| | | | |
|---|---|---|---|
| 6,810,084 B1 * | 10/2004 | Jun et al. | 375/240.28 |
| 6,924,753 B2 * | 8/2005 | Bretl et al. | 341/50 |
| 6,980,603 B2 * | 12/2005 | Choi et al. | 375/295 |
| 7,020,828 B2 * | 3/2006 | Birru | 714/792 |
| 7,111,221 B2 * | 9/2006 | Birru et al. | 714/755 |
| 7,197,685 B2 * | 3/2007 | Limberg | 714/756 |
| 7,206,352 B2 * | 4/2007 | Birru et al. | 375/265 |
| 7,298,786 B2 * | 11/2007 | Choi et al. | 375/265 |
| 7,599,348 B2 * | 10/2009 | Kang et al. | 370/350 |
| 7,675,994 B2 * | 3/2010 | Gaddam et al. | 375/301 |
| 2004/0240590 A1 * | 12/2004 | Cameron et al. | 375/340 |
| 2006/0140301 A1 | 6/2006 | Choi et al. | |

OTHER PUBLICATIONS

De Castro, F.C.C., et al., "8-VSB Channel Coding Analysis for DTV Broadcast," IEEE Transactions on Consumer Electronics, vol. 46, No. 3, pp. 539-547, Aug. 2000.
Bretl, W.E., et al., "Enhanced VSB System," IEEE Transactions on Consumer Electronics, vol. 48, No. 3, pp. 533-538, Aug. 2002.

* cited by examiner

*Primary Examiner* — Bhavesh M Mehta
*Assistant Examiner* — Utpal Shah
(74) *Attorney, Agent, or Firm* — Lee, Hong, Degerman, Kang & Waimey

(57) ABSTRACT

An E8-VSB reception system, apparatus for generating data attribute and method thereof, and apparatus for channel encoding and method thereof are disclosed. In the present invention, E8-VSB data resulting from multiplexing a plurality of enhanced data encoded at different coding rates with main data is received. And, the main data and a plurality of the enhanced data are identified to be modulated from the received E8-VSB data. In particular, by generating M/E packet attribute information, enhanced packet attribute information, enhanced byte attribute information and E8-VSB symbol attribute information from the E8-VSB data attribute generating apparatus, the channel decoding apparatus can correctly identify to decode the main data, ½ enhanced data and ¼ enhanced data from one another.

12 Claims, 11 Drawing Sheets

E8-VSB RECEPTION SYSTEM, APPARATUS FOR GENERATING DATA ATTRIBUTE AND METHOD THEREOF, AND APPARATUS FOR CHANNEL ENCODING AND METHOD THEREOF

This application is a continuation of U.S. application Ser. No. 11/286,511, filed Nov. 22, 2005, now U.S. Pat. No. 7,840,077, which pursuant to 35 U.S.C. §119(a) claims the benefit of Korean Patent Application No. 10-2004-0096358, filed on Nov. 23, 2004, which is hereby incorporated by reference as if fully set forth herein.

BACKGROUND OF THE INVENTION

1. Field of the Invention

The present invention relates to an enhanced 8-VSB reception system receiving a plurality of enhanced data encoded at different coding rates, and more particularly, to an apparatus for demodulating main data and a plurality of enhanced data separated from received E8-VSB data and method thereof.

2. Discussion of the Related Art

The ATSC (advanced television systems committee) 8VSB (vestigial sideband) transmission was adopted by U.S.A. as the standard for terrestrial digital broadcasting in 1995, which has been performed since 1998. And, Korea has adopted the same ATSC 8VSB transmission system as the standard in broadcasting.

Specifications of the ATSC 8VSB transmission system were established to basically target high quality of image. Yet, the demand for a transmission specification of a system enabling a stable reception despite the accompanied degradation of image quality or a system enabling data communications requesting more stable reception than that of a video signal due to the characteristics of contents has risen. Moreover, the additional transmission specifications are stipulated within a range that avoids causing bad influence to the system receiving a conventional ATSC 8VSB signal. And, it is also stipulated that a receiver according to a new specification can receive both an enhanced 8-VSB signal (hereinafter abbreviated E8-VSB) and the conventional ATSC 8VSB signal.

Hence, the E8-VSB system employs the conventional 8VSB system as it is, adds a new service, and enables the newly added service to have a reception better than that of an old service. And, the E8-VSB system enables the old service to have a more stable reception performance attributed to influence of the added service.

SUMMARY OF THE INVENTION

Accordingly, the present invention is directed to an E8-VSB reception system, apparatus for generating data attribute and method thereof, and apparatus for channel encoding and method thereof that substantially obviate one or more problems due to limitations and disadvantages of the related art.

An object of the present invention is to provide an E8-VSB reception system, in which main data and a plurality of enhanced data respectively encoded at different coding rates, which are multiplexed to be transmitted, are received.

Another object of the present invention is to provide an apparatus for decoding and method thereof, in which the received multiplexed main data and a plurality of the received multiplexed enhanced data are identified to be decoded.

A further object of the present invention is to provide an apparatus for generating data attribute information and method thereof, by which the received multiplexed main data and a plurality of the received multiplexed enhanced data are identified from each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an E8-VSB reception system, which receives ½ enhanced data encoded at a ½ coding rate, ¼ enhanced data encoded at a ¼ coding rate, and main data multiplexed and transmitted from an E8-VSB transmission system, according to the present invention includes a tuner receiving an E8-VSB modulated RF signal via an antenna, the tuner selecting an RF signal of a specific channel by tuning, the tuner converting the selected signal to an IF signal to output, a demodulating unit converting the IF signal outputted from the tuner to a baseband signal to output, a map information restoring unit detecting a field sync signal and a segment sync signal within a frame by performing a frame restoration from an output of the demodulating unit or a channel-equalized signal, the map information restoring unit extracting enhanced mode map information including multiplexing information of main data, ½ enhanced data and ¼ enhanced data from a modulated signal using the detected sync signals to perform decoding, a data attribute generating unit generating E8-VSB data attribute information including main/enhanced (M/E) packet attribute information, enhanced byte attribute information, enhanced packet attribute information and E8-VSB symbol attribute information according to the detected sync signals and the enhanced mode map information extracted by the map information restoring unit, a channel equalizing unit compensating channel distortion included in the demodulated signal by receiving the sync signals and the E8-VSB data attribute information, and a channel decoding unit decoding the main data, a first enhanced data and a second enhanced data from a signal equalized by the channel equalizing unit using the sync signals and the E8-VSB data attribute information.

In another aspect of the present invention, a data attribute generating apparatus of an E8-VSB reception system, which restores enhanced mode map information and generates E8-VSB data attribute information for channel equalization and decoding by receiving ½ enhanced data encoded at a ½ coding rate, ¼ enhanced data encoded at a ¼ coding rate, and main data multiplexed and transmitted from an E8-VSB transmission system, includes an enhanced packet attribute generating unit deciding whether an enhanced packet is a ½ enhanced packet or a ¼ enhanced packet using the enhanced mode map information, the enhanced packet attribute generating unit generating attribute information indicating a corresponding decision result by a packet unit, an enhanced byte attribute generating unit generating attribute information indicating whether each byte of the enhanced packet is expanded according to ½ enhanced rule or ¼ enhanced rule using the attribute information of the enhanced packet attribute generating unit by a byte unit, an M/E packet attribute generating unit generating attribute information indicating whether a packet configured after data de-interleaving is a main packet or an enhanced packet by the packet unit using the attribute information of the enhanced byte attribute generating unit and the enhanced mode map information, the M/E packet attribute generating unit generating attribute information corresponding to each byte of one packet by the byte unit, and an E8-VSB symbol attribute generating unit generating attribute information indicating an attribute of each symbol by a symbol unit using the attribute information corresponding to each byte of one packet of the M/E packet attribute generating unit.

In another aspect of the present invention, a channel decoding apparatus of an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a data attribute generating unit generating to output main/enhanced (M/E) packet attribute information, enhanced byte attribute information, enhanced packet attribute information and E8-VSB symbol attribute information by restoring enhanced mode map information including multiplexing information of the main data, the ½ enhanced data and the ¼ enhanced data from the demodulated or channel-equalized signal, a main data decoding unit performing Viterbi decoding, symbol-byte conversion and de-interleaving on an E8-VSB symbol equalized in the channel equalizing unit according to the E8-VSB symbol attribute information, the main data decoding unit sequentially performing RS decoding and de-randomizing on the de-interleaved data according to the M/E packet attribute information to output an MPEG packet, a data reconfiguring unit reconfiguring to output an enhanced byte with significant bits only in each byte by removing a main packet from the packet de-randomized and outputted from the main data decoding unit according to the M/E packet attribute information and the enhanced byte attribute information and by removing an MPEG header from an enhanced packet, and an enhanced data output unit sequentially performing de-interleaving and RS decoding on the reconfigured enhanced packet, the enhanced data output unit separating the RS-decoding packet into a ½ enhanced packet and a ¼ enhanced packet according to the enhanced packet attribute information, the enhanced data output unit converting separated 164-byte packets to 188-byte MPEG packets to output by matching synchronization.

In another aspect of the present invention, a channel decoding apparatus of an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a data attribute generating unit generating to output main/enhanced (M/E) packet attribute information, enhanced byte attribute information, enhanced packet attribute information and E8-VSB symbol attribute information by restoring enhanced mode map information including multiplexing information of the main data, the ½ enhanced data and the ¼ enhanced data from the demodulated or channel-equalized signal, a main data decoding unit sequentially performing Viterbi decoding, symbol-byte conversion, de-interleaving, RS decoding and de-randomizing on the channel-equalized E8-VSB symbol to output an MPEG packet, an enhanced data processing unit sequentially performing Viterbi decoding, symbol-byte conversion, de-interleaving, RS parity removal and de-randomizing on the channel-equalized E8-VSB symbol to output according to the E8-VSB symbol attribute information, a data reconfiguring unit reconfiguring to output an enhanced byte with significant bits only in each byte within an enhanced packet by removing a main packet from the packet de-randomized and outputted from the enhanced data processing unit according to the M/E packet attribute information and by removing an MPEG header from the enhanced packet according to the enhanced byte attribute information, and an enhanced data output unit sequentially performing de-interleaving and RS decoding on the reconfigured enhanced packet, the enhanced data output unit separating the RS-decoding packet into a ½ enhanced packet and a ¼ enhanced packet according to the enhanced packet attribute information, the enhanced data output unit converting separated 164-byte packets to 188-byte MPEG packets to output by matching synchronization.

In another aspect of the present invention, a channel decoding apparatus of an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a data attribute generating unit generating to output main/enhanced (M/E) packet attribute information, enhanced byte attribute information, enhanced packet attribute information and E8-VSB symbol attribute information by restoring enhanced mode map information including multiplexing information of the main data, the ½ enhanced data and the ¼ enhanced data from the demodulated or channel-equalized signal, a main data decoding unit sequentially performing Viterbi decoding, symbol-byte conversion, de-interleaving, RS decoding and de-randomizing on an E8-VSB symbol equalized in the channel equalizing unit to output an MPEG packet according to the E8-VSB symbol attribute information, a data reconfiguring unit reconfiguring to output an enhanced byte with significant bits only in each byte by removing an RS parity from the de-interleaved packet outputted from the main data decoding unit, by removing a main packet from the de-randomized packet according to the M/E packet attribute information and the enhanced byte attribute information, and by removing an MPEG header from an enhanced packet, and an enhanced data output unit sequentially performing de-interleaving and RS decoding on the reconfigured enhanced packet, the enhanced data output unit separating the RS-decoding packet into a ½ enhanced packet and a ¼ enhanced packet according to the enhanced packet attribute information, the enhanced data output unit converting separated 164-byte packets to 188-byte MPEG packets to output by matching synchronization.

In another aspect of the present invention, a method of generating data attributes in an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a step (a) of restoring enhanced mode map information including multiplexing information of the main data, ½ enhanced data and ¼ enhanced data from the modulated or channel-equalized signal, a step (b) of deciding whether an enhanced packet is a ½ enhanced packet or a ¼ enhanced packet using the enhanced mode map information and generating attribute information indicating a corresponding decision result by a packet unit, a step (c) of generating attribute information indicating whether each byte of the enhanced packet is expanded according to ½ enhanced rule or ¼ enhanced rule using the attribute information of the enhanced packet attribute generating unit by a byte unit, a step (d) of generating attribute information indicating whether a packet configured after data de-interleaving is a main packet or an enhanced packet by the packet unit using the attribute information of the enhanced byte attribute generating unit and the enhanced mode map information and generating attribute information corresponding to each byte of one packet by the byte unit, and a step (e) of generating attribute information indicating an attribute of each symbol by a symbol unit using the attribute information corresponding to each byte of one packet of the M/E packet attribute generating unit.

In another aspect of the present invention, a channel decoding method in an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a step (a) of restoring enhanced mode map information including multiplexing information of the main data, ½ enhanced data and ¼ enhanced data from the modulated or channel-equalized signal, a step (b) of generating to output main/enhanced (M/E) packet attribute information, enhanced byte attribute information, enhanced packet attribute information and E8-VSB symbol attribute information using the enhanced mode map information, a step (c) of performing Viterbi decoding, symbol-byte conversion and de-interleaving on an E8-VSB symbol equalized in the channel equalizing unit according to the E8-VSB symbol attribute information and performing RS decoding and de-randomizing on the de-interleaved data according to the M/E packet attribute information to output an MPEG packet, a step (d) of reconfiguring to output an enhanced byte with significant bits only in each byte by removing a main packet from the packet de-randomized and outputted from the main data decoding unit according to the M/E packet attribute information and the enhanced byte attribute information and by removing an MPEG header from an enhanced packet, and a step (e) of sequentially performing de-interleaving and RS decoding on the reconfigured enhanced packet, separating the RS-decoding packet into a ½ enhanced packet and a ¼ enhanced packet according to the enhanced packet attribute information, and converting separated 164-byte packets to 188-byte MPEG packets to output by matching synchronization.

In another aspect of the present invention, a channel decoding method in an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a step (a) of restoring enhanced mode map information including multiplexing information of the main data, ½ enhanced data and ¼ enhanced data from the modulated or channel-equalized signal, a step (b) of generating to output main/enhanced (M/E) packet attribute information, enhanced byte attribute information, enhanced packet attribute information and E8-VSB symbol attribute information using the enhanced mode map information, a step (c) of sequentially performing Viterbi decoding, symbol-byte conversion, de-interleaving, RS decoding and de-randomizing on the channel-equalized E8-VSB symbol to output an MPEG packet, a step (d) of sequentially performing Viterbi decoding, symbol-byte conversion, de-interleaving, RS parity removal and de-randomizing on the channel-equalized E8-VSB symbol to output according to the E8-VSB symbol attribute information, a step (e) of reconfiguring to output an enhanced byte with significant bits only in each byte within an enhanced packet by removing a main packet from the packet de-randomized and outputted from the enhanced data processing unit according to the M/E packet attribute information and by removing an MPEG header from the enhanced packet according to the enhanced byte attribute information, and a step (f) of sequentially performing de-interleaving and RS decoding on the reconfigured enhanced packet, separating the RS-decoding packet into a ½ enhanced packet and a ¼ enhanced packet according to the enhanced packet attribute information, and converting separated 164-byte packets to 188-byte MPEG packets to output by matching synchronization.

In a further aspect of the present invention, a channel decoding method in an E8-VSB reception system, which performs decoding, channel equalization and channel decoding by receiving ½ enhanced data encoded at a ½ coding rate, ¼ enhanced data encoded at a ¼ coding rate, and main data multiplexed and transmitted from an E8-VSB transmission system, includes a step (a) of restoring enhanced mode map information including multiplexing information of the main data, ½ enhanced data and ¼ enhanced data from the modulated or channel-equalized signal, a step (b) of generating to output main/enhanced (M/E) packet attribute information, enhanced byte attribute information, enhanced packet attribute information and E8-VSB symbol attribute information using the enhanced mode map information, a step (c) of sequentially performing Viterbi decoding, symbol-byte conversion, de-interleaving, RS decoding and de-randomizing on an E8-VSB symbol equalized in the channel equalizing unit to output an MPEG packet according to the E8-VSB symbol attribute information, a step (d) of reconfiguring to output an enhanced byte with significant bits only in each byte by removing an RS parity from the de-interleaved and outputted packet, by removing a main packet from the de-randomized packet according to the M/E packet attribute information and the enhanced byte attribute information, and by removing an MPEG header from an enhanced packet, and a step (e) of sequentially performing de-interleaving and RS decoding on the reconfigured enhanced packet, separating the RS-decoding packet into a ½ enhanced packet and a ¼ enhanced packet according to the enhanced packet attribute information, and converting separated 164-byte packets to 188-byte MPEG packets to output by matching synchronization.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
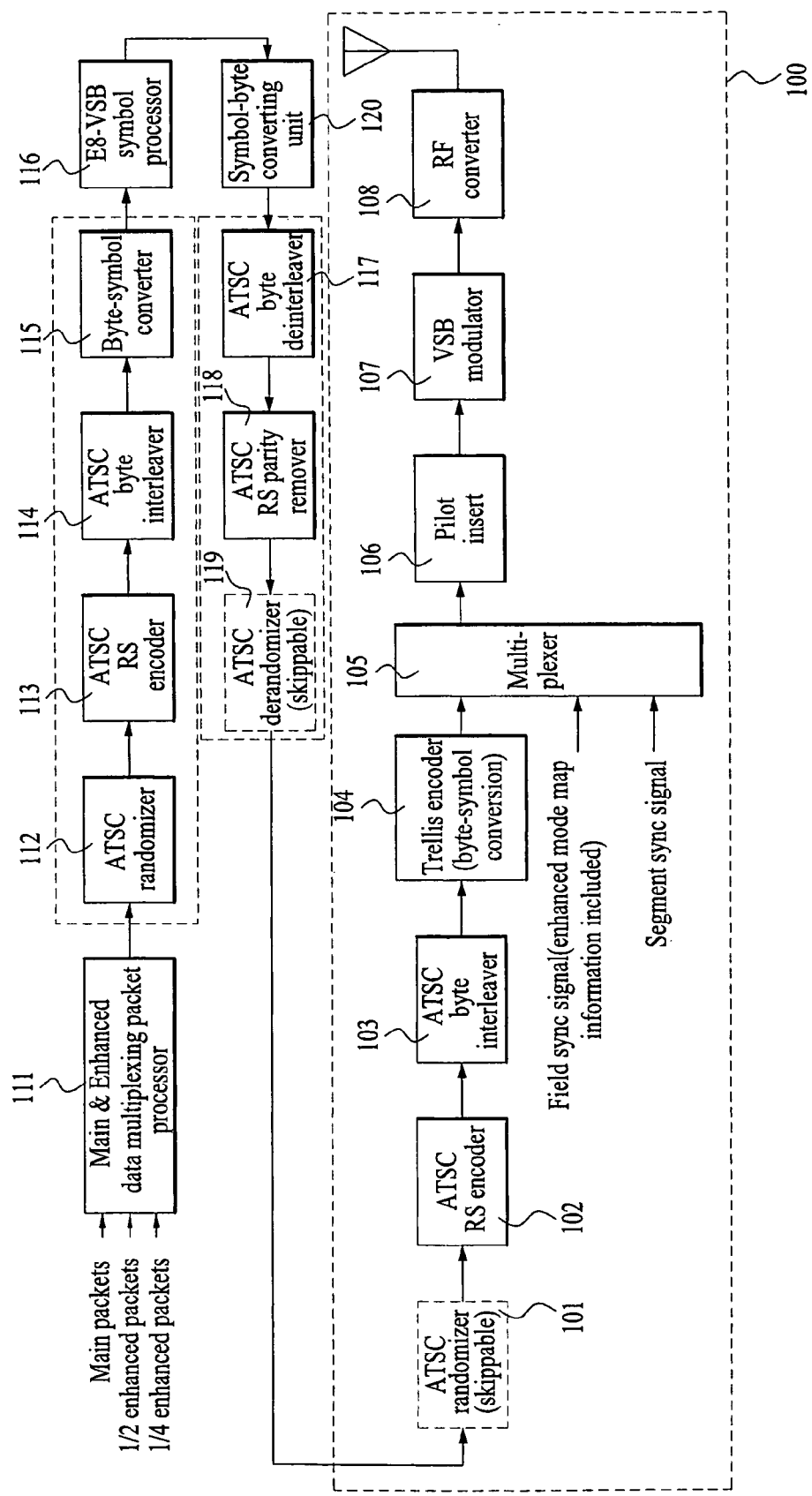
FIG. 1 is a block diagram of an E8-VSB transmission system according to the present invention.
Figure 3:
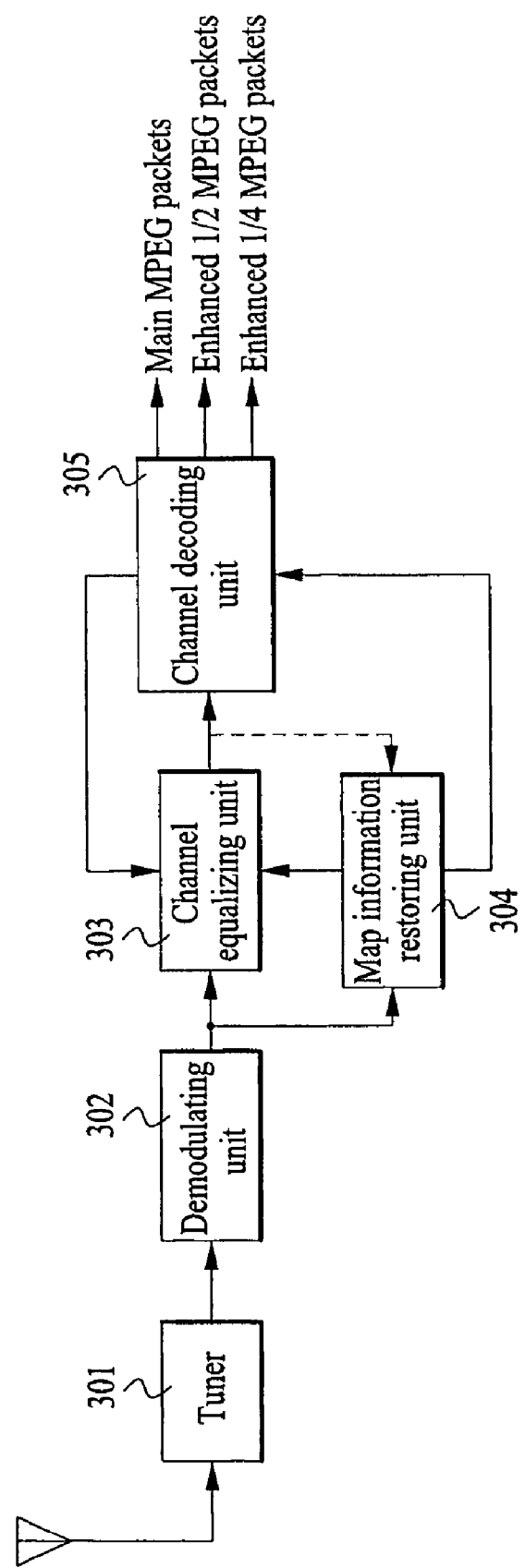
FIG. 3 is a block diagram of an E8-VSB reception system according to one embodiment of the present invention.

First of all, overall configurations of a transmitter and receiver fit for the E8-VSB specification have been proposed by the present applicant. FIG. 1 is a block diagram of an E8-VSB transmission system and FIG. 3 is a block diagram of an E8-VSB transmission system.

Namely, the E8-VSB transmission system can transmit popularized MPEG-4 pictures or various supplementary data (e.g., program executing file, stock information, etc.) via enhanced data. And, the E8-VSB transmission system can transmit MPEG-2 pictures and Dolby sound data.

Hereinafter, for convenience of description, the conventional MPEG-2 picture is defined as a main data or main symbol. In this case, compared to the main data, the enhanced data performs additional error correction coding. A ½ enhanced data among the enhanced data (or enhanced symbol) means a data additionally coded at a coding rate corresponding to a half coding rate of the main data. And, a ¼ enhanced data among the enhanced data (or enhanced symbol) means a data additionally coded at a coding rate a quarter coding rate of the main data. Hence, these enhanced data have better reception performance in the interference attributed to noise and multi-path occurring in channel than that of the main data. In particular, the ¼ enhanced data coded at the ¼ coding rate has better performance than that of the ½ enhanced data coded at the ½ coding rate.

The E8-VSB transmission system is explained with reference to FIG. 1 as follows.

Referring to FIG. 1, a main and enhanced multiplexing packet processing unit 111 receives ½ enhanced data and ¼ enhanced data, performs E8-VSP pre-processing thereon, and then multiplexes the enhanced data through the E8-VSP pre-processing and main data into 188-byte packet units (called segment units).

Figure 2:
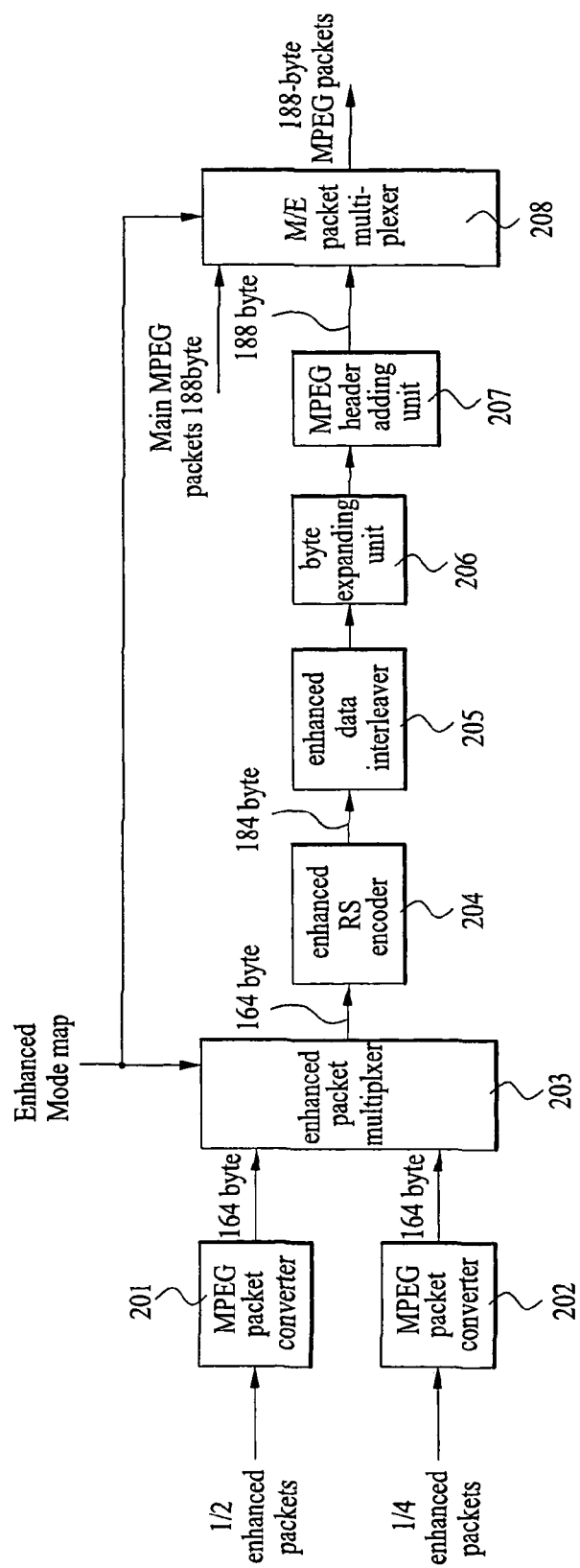
FIG. 2 is a detailed block diagram of a main and enhanced multiplexing packets processor in FIG. 1.

FIG. 2 is a detailed block diagram of the main and enhanced multiplexing packet processing unit 111. A first MPEG packet converter 201 divides the ½ enhanced data inputted as a packet of the 188-byte unit into 164-byte units to output to an enhanced multiplexer 203 without data alteration. A second MPEG packet converter 202 divides the ¼ enhanced data inputted as a packet of the 188-byte unit into 164-byte units to output to the enhanced multiplexer 203 without data alteration.

The multiplexer 203 multiplexes the ½ and ¼ enhanced data of the 164-byte unit each into a packet of 164-byte unit according to enhanced mode map information within a field synchronization segment and then outputs the packet to a Reed-Solomon encoder 204. In this case, the number of the ½ enhanced data packet (i.e., 164 bytes) multiplexed to one VSB data field and the number of the ¼ enhanced data packet (i.e., 164 bytes) multiplexed to one VSB data field are defined as H and Q, respectively. To de-multiplex the enhanced packet of 164-byte unit in the E8-VSB reception system, attribute indicating whether a current packet is the ½ enhanced data or the ¼ enhanced data is needed.

The enhanced Reed-Solomon encoder 204 converts the enhanced data of 164-byte unit to a packet of 184-byte unit by attaching a 20-byte parity code to the enhanced data multiplexed in the enhanced multiplexer 203 and then outputs the packet to an enhanced data interleaver 205. To raise performance against burst noise, the enhanced data interleaver 205 changes a sequence of the enhanced data outputted from the Reed-Solomon encoder 204 to output to a byte expander 206. The byte expander 206 inserts null bits corresponding to the ½ or ¼ enhanced data outputted from the data interleaver 205 in the packet to expand.

Namely, if a 1-byte ½ enhanced data is inputted, the byte expander 206 inserts a null bit between bits to expand the data into 2-bytes. If a 1-byte ¼ enhanced data is inputted, the byte expander 206 repeats each bit twice and inserts a predetermined null bit between the bits to expand the data into 4-bytes. The null bits are replaced by parity bits by a convolutional encoder of an E8-VSB symbol processing unit 116 later. In order for the E8-VSB reception system to output the byte configured with significant bits only by removing bits overlapped with the null bits, enhanced byte attribute information for identifying the ½ enhanced data and ¼ enhanced data is needed.

The data expanded by the byte expander 206 is then outputted to an MPEG header adder 207.

The MPEG header adder 207 makes an MPEG compatible packet of 188-bute unit by adding a 4-byte null MPEG header to a front side of each 184-byte unit of the enhanced data having the null bits inserted therein and then outputs the MPEG compatible packet to an M/E (main/enhanced) multiplexer 208. Namely, a 188-byte packet constructed with a main byte of 4-bytes and an enhanced byte of 184 bytes is provided.

Hence, in the E8-VSB reception system, it is necessary to identify a header and enhanced data part of the packet from each other. For this, M/E attribute information is required.

The M/E multiplexer 208 multiplexes main MPEG data inputted by 188-byte unit and the enhanced packet inputted by 188-byte unit from the MPEG header adder 207 according to the enhanced mode map information within the field synchronization segment. Likewise, in the E8-VSB reception system, to de-multiplex the multiplexed 188-byte-unit main and enhanced packets, M/E packet attribute information for identifying whether a currently received packet is the main or enhanced pact is needed.

The multiplexing information for multiplexing the ½ and the ¼ enhanced data in the enhanced multiplexer 203 or the multiplexing information for multiplexing the main and enhanced data in the M/E multiplexer 208 is called the enhanced mode map information. And, the enhanced mode map information is transmitted to a receiving side together with real data (i.e., main data and enhanced data).

As mentioned in the foregoing description, the 188-byte-unit MPEG data, which is multiplexed and outputted from the main and enhanced multiplexing processor 111, is outputted to an ATSC randomizer 112.

The ATSC randomizer 112 performs a randomizing process on 187-byte data resulting from excluding an MPEG sync byte from the received 188-byte MPEG data and then outputs the randomized data to an ATSC Reed-Solomon (RS) encoder 113.

The ATSC RS encoder 113 adds a 20-byte parity to the 187-byte data to output to an ATSC byte interleaver 114. The ATSC byte interleaver 114 performs interleaving on the input data by byte unit and then outputs the interleaved data to a byte-symbol converter 115. The byte-symbol converter 115 converts the data inputted by byte unit to symbol-unit data, performs 12-way interleaving on the converted data, and then outputs the interleaved data to an ES-VSB symbol processor 116. Namely, one byte is converted to f-symbols by 2-bits.

The E8-VSB symbol processor 116 performs convolution encoding on the symbol-unit enhanced data only, performs 12-way de-interleaving on the symbol-unit data, converts the de-interleaved data to byte-unit data, and then outputs the converted data to an ATSC byte de-interleaver 117.

The ATSC byte de-interleaver 117 performs de-interleaving on the byte-unit input data in a process reverse to that of the interleaving and then outputs the de-interleaved data to an ATSC RS parity remover 118. The ATSC RS parity remover 118 removes the 20-byte parity added by the ATSC RS encoder 113 from the de-interleaved data and then outputs the parity-removed data to an 8VSB transmission unit 100.

The 8VSB transmitting unit 100, which has the same configuration of the related art ATSC 8VSB transmission system, includes an ATSC randomizer (skippable) 101, an ATSC Reed-Solomon encoder 102, an ATSC byte interleaver 103, a Trellis encoder 104, a multiplexer 105, a pilot adder 106, a VSB modulator 107 and an RF converter 108.

Namely, while the data, of which parity was removed by the ATSC RS parity remover 118, passes through the ATSC Reed-Solomon encoder 102 and the ATSC byte interleaver 103, Reed-Solomon encoding for adding a 20-byte parity code to the data and data interleaving for changing a sequence of data are carried out. The interleaved data is encoded by the Trellis encoder 104 and is then inputted to the multiplexer 105.

The multiplexer 105 multiplexes a Trellis coded symbol sequence, a field sync signal, a segment sync signal and enhanced mode map information. The pilot adder 106 adds a pilot signal to the multiplexed signal to output to the VSB converter 107. The VSB converter 107 modulates the signal to which the pilot signal is added into an 8VSB signal of an intermediate frequency band to output to the RF converter 108. The RF converter 108 converts the VSB-modulated signal to an RF band signal and then transmits the RF band signal via an antenna. In doing so, the enhanced mode map information is inserted in a field sync interval and includes main/enhanced data multiplexing information associated with a multiplexing rule and a transmission packet number of the enhanced data.

In this case, the ATSC randomizer 112, ATSC RS encoder 113, ATSC byte interleaver 114 and byte-symbol converter 115 can be called a channel encoding unit.

FIG. 3 is a schematic block diagram of an E8-VSB reception system receiving the main and enhanced data transmitted from the above-described E8-VSB transmission system according to one embodiment of the present invention, which was filed by the present applicant (Korean Patent Application No. P03-83688).

Referring to FIG. 3, if an E8-VSB-modulated RF signal is received via an antenna, a tuner 301 selects an RF signal of a specific channel only by tuning, converts the selected signal to an IF signal, and then outputs the IF signal to a demodulator unit 302. The demodulator unit 302 carries out VSB demodulation such as automatic gain control (AGC), A/D conversion, carrier restoration, timing restoration and the like on the IF signal and then outputs the demodulated signal to a channel equalizing unit 303 and a map information restoring unit 304.

The map information restoring unit 304 restores the enhanced mode map information of a transmitted current field and then provides the restored information to the channel equalizing unit 303 and a channel decoder 305. And, the map information restoring unit 304 generates symbol attribute information instructing every attribute of each symbol of a VSB signal by the enhanced mode map information of the current field and then provides the generated information to the channel equalizing unit 303 and the channel decoder 305.

The channel equalizing unit 303 receives a decision value of the channel decoder 305 in the rear end and the symbol attribute information of the map information restoring unit 304, compensates channel distortion included in the VSB-demodulated signal, and then outputs the compensated signal to the channel decoder 305. The channel decoder 305 decodes a signal equalized in a corresponding mode using the E8-VSB map information indicating multiplexing information of a currently received E8-VSB signal and the E8-VSB symbol attribute information. Thus, the E8-VSB reception system can receive a main VSB stream (main MPEG packets) and an enhanced VSB stream as a ½ enhanced stream (enhanced ½ MPEG packets) as and a ¼ enhanced stream (enhanced ¼ MPEG packets). In this case, the mode means quantities and methods for the main data of the conventional ATSC 8VSB data, the ½ enhanced data and the ¼ enhanced data which are multiplexed within one field.

Figure 4:
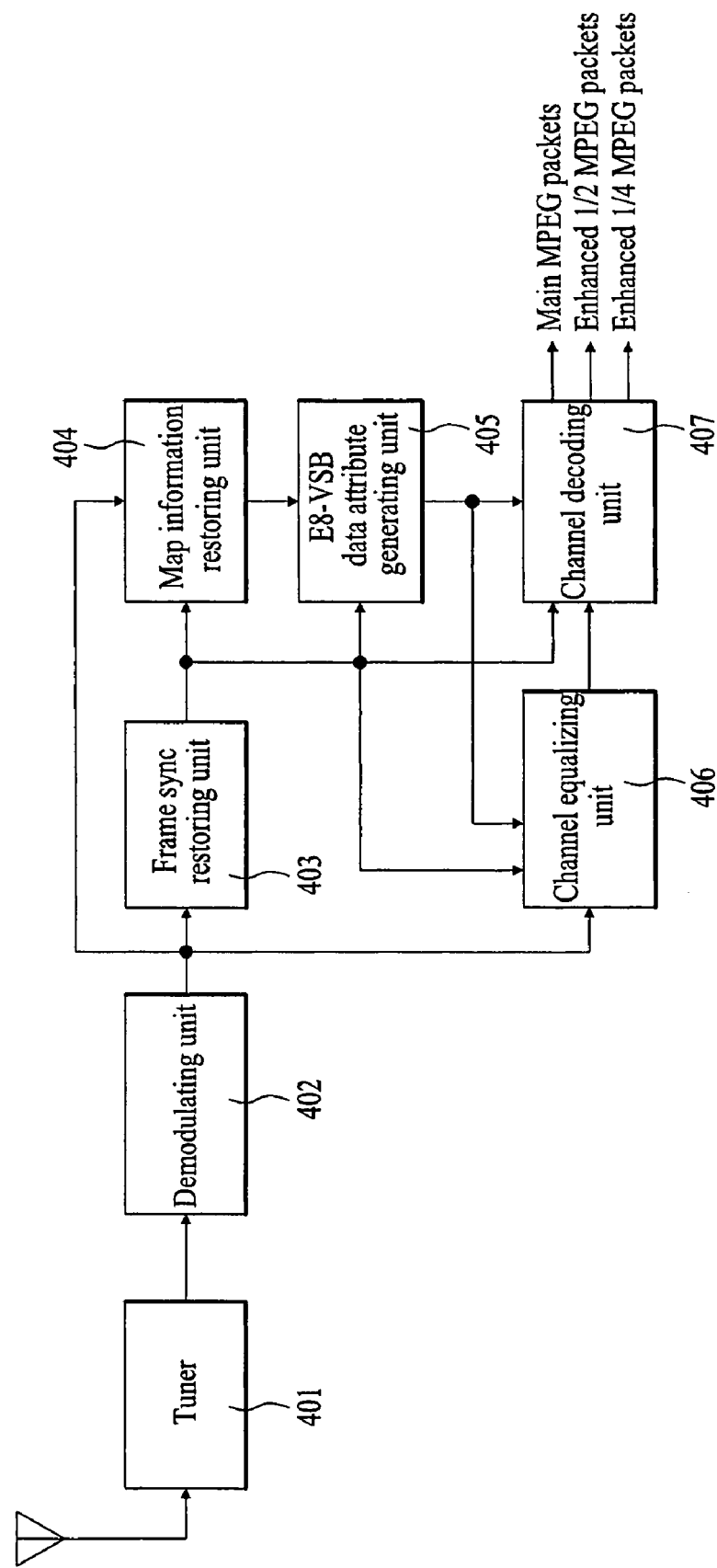
FIG. 4 is a block diagram of an E8-VSB reception system according to another embodiment of the present invention.

FIG. 4 is a block diagram of an E8-VSB reception system according to another embodiment of the present invention.

Referring to FIG. 4, like the tuner 301 shown in FIG. 3, if an E8-VSB-modulated RF signal is received via an antenna, a tuner 401 selects an RF signal of a specific channel only by tuning, converts the selected signal to an IF signal, and then outputs the IF signal to a demodulator unit 402. The demodulator unit 402 carries out VSB demodulation such as automatic gain control (AGC), A/D conversion, carrier restoration, timing restoration and the like on the IF signal and then outputs the VSB-demodulated signal to a frame synchronization restoring unit 403, a map information restoring unit 404 and a channel equalizing unit 406.

The frame synchronization restoring unit 403 detects a field sync signal and a segment sync signal within a VSB data frame from an output of the demodulator unit 403 and/or an output of the channel equalizing unit 406 and then outputs the detected signal(s) to the map information restoring unit 404, the data attribute generating unit 405, the channel equalizing unit 406 and the channel decoder 407.

The map information restoring unit 404 restores the enhanced mode map information of a transmitted current field from the output of the demodulator unit 402 and/or the output of the channel equalizing unit 406 and then provides the restored information to the E8-VSB data attribute generating unit 405. The enhanced mode map information includes information indicating how main data, ½ enhanced data and ¼ enhanced data are multiplexed.

The E8-VSB data attribute generating unit 405 generates attribute information of current E8-VSB data, which instructs every attribute of each data of an E8-VSB signal by the enhanced mode map information of the current field and a field sync signal. The E8-VSB data is divided by symbol unit, byte unit and packet unit, whereby each attribute is needed.

In this case, the E8-VSB data attribute generating unit 405 provides attribute information of a current VSB symbol to the channel equalizing unit 406 and the channel decoder 407. Hence, the channel equalizing unit 406 can perform enhanced equalization and the channel decoder 407 can perform channel decoding suitable for a currently received mode.

Namely, the channel equalizing unit 406 receives a decision value of the channel decoder 407 in the rear end and the symbol attribute information of the map information restoring unit 405, compensates channel distortion included in the signal VSB-demodulated by the demodulator unit 402, and then outputs the compensated signal to the channel decoder 407.

And, the channel decoder 407 decodes a signal equalized in a corresponding mode using the E8-VSB symbol attribute information indicating multiplexing information of a currently received E8-VSB signal (main MPEG packets, enhanced ½ MPEG packets, enhanced ¼ MPEG packets).

The E8-VSB data attribute generating unit 405 generates E8-VSB symbol attribute information, main/enhanced (M/E) packet attribute information, enhanced byte attribute information, enhanced packet attribute information and the like.

This is because the above-explained four kinds of the attribute information are needed for the channel decoder to decode and de-multiplex the E8-VSB signal.

Namely, the enhanced packet attribute information is the attribute information indicating whether a packet currently inputted for de-multiplexing an enhanced packet is the ½ or ¼ enhanced packet.

The enhanced byte attribute information is the attribute information indicating whether each byte of an enhanced packet inputted for null-bit removal is expanded according to ½ enhanced rule or ¼ enhanced rule.

The main/enhanced (M/E) packet attribute information is the information indicating whether a packet configured after data de-interleaving is a main packet or an enhanced packet.

And, the E8-VSB symbol attribute information is the information indicating the attribute for the E8-VSB symbol inputted to the Viterbi decoder within the channel decoder. Namely, the E8-VSB symbol attribute information includes the information indicating whether the inputted symbol is the main or enhanced symbol, the information indicating whether the enhanced symbol is the ½ or ¼ enhanced symbol, the information indicating whether the ¼ enhanced symbol has the same polarity of a neighbor symbol, and the information indicating whether the main symbol causes the inversion of polarity.

Figure 5A:
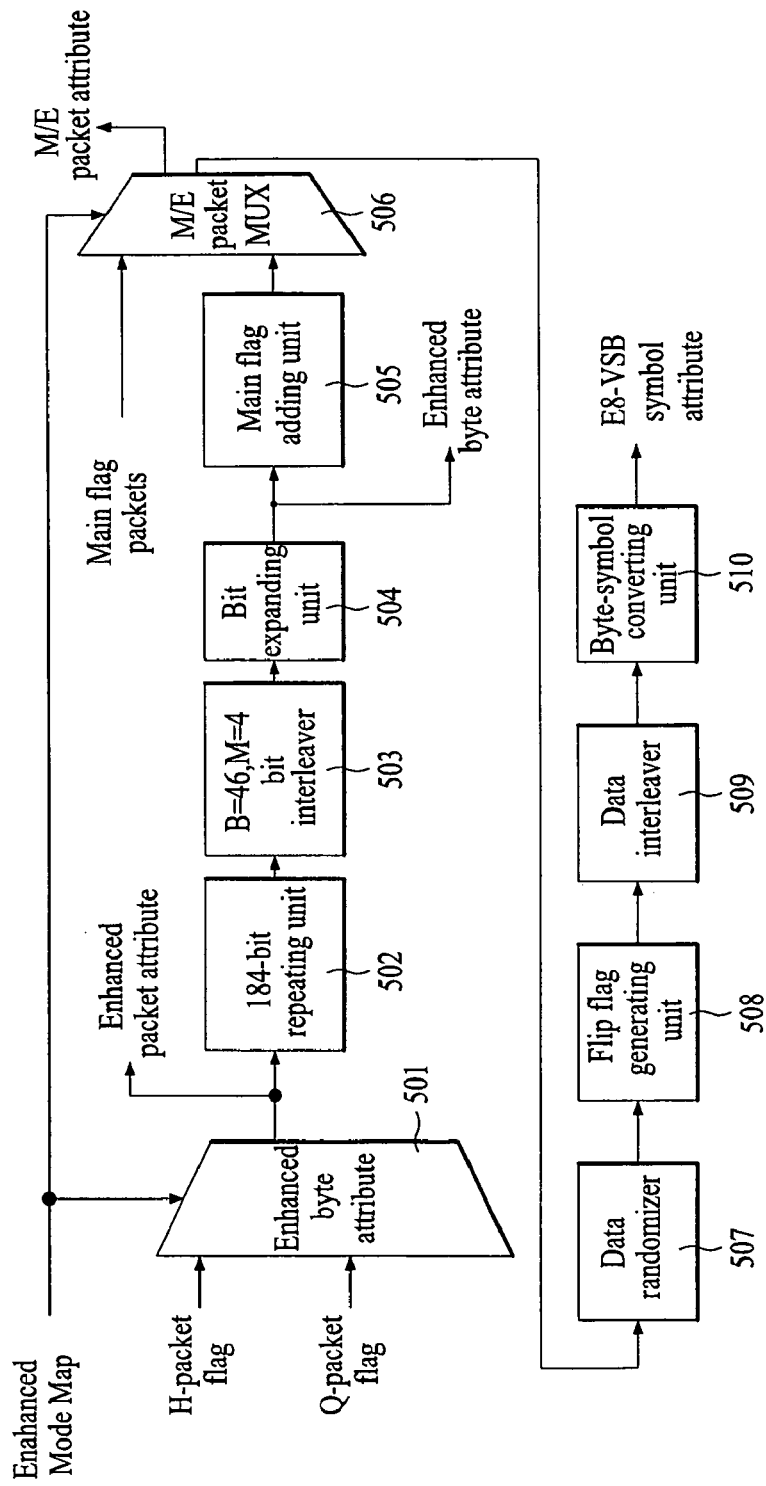
FIG. 5A is a block diagram of an E8-VSB data attribute generating apparatus according to the present invention.

FIG. 5A is a block diagram of an E8-VSB data attribute generating apparatus according to the present invention.

Referring to FIG. 5A, an E8-VSB data attribute generating apparatus according to the present invention includes one part corresponding to a main and enhanced multiplexing packet processing unit and the other part corresponding to a channel encoding unit in a transmitting unit.

The part corresponding to the main and enhanced multiplexing packet processing unit includes an enhanced packet multiplexer 501, a 184-bit repeating unit 502, a bit interleaver 503, a bit expanding unit 504, a main flag adding unit 505 and an M/E packet multiplexer 506 to generate enhanced packet attribute information, enhanced byte attribute information, M/E packet attribute information and attribute information for each byte of one packet.

The part corresponding to the channel encoding unit includes a data randomizer 507, a flip flag generating unit 508, a data interleaver 509 and a byte-symbol converting unit 510 to generate E8-VSB symbol attribute information.

Figure 5B:
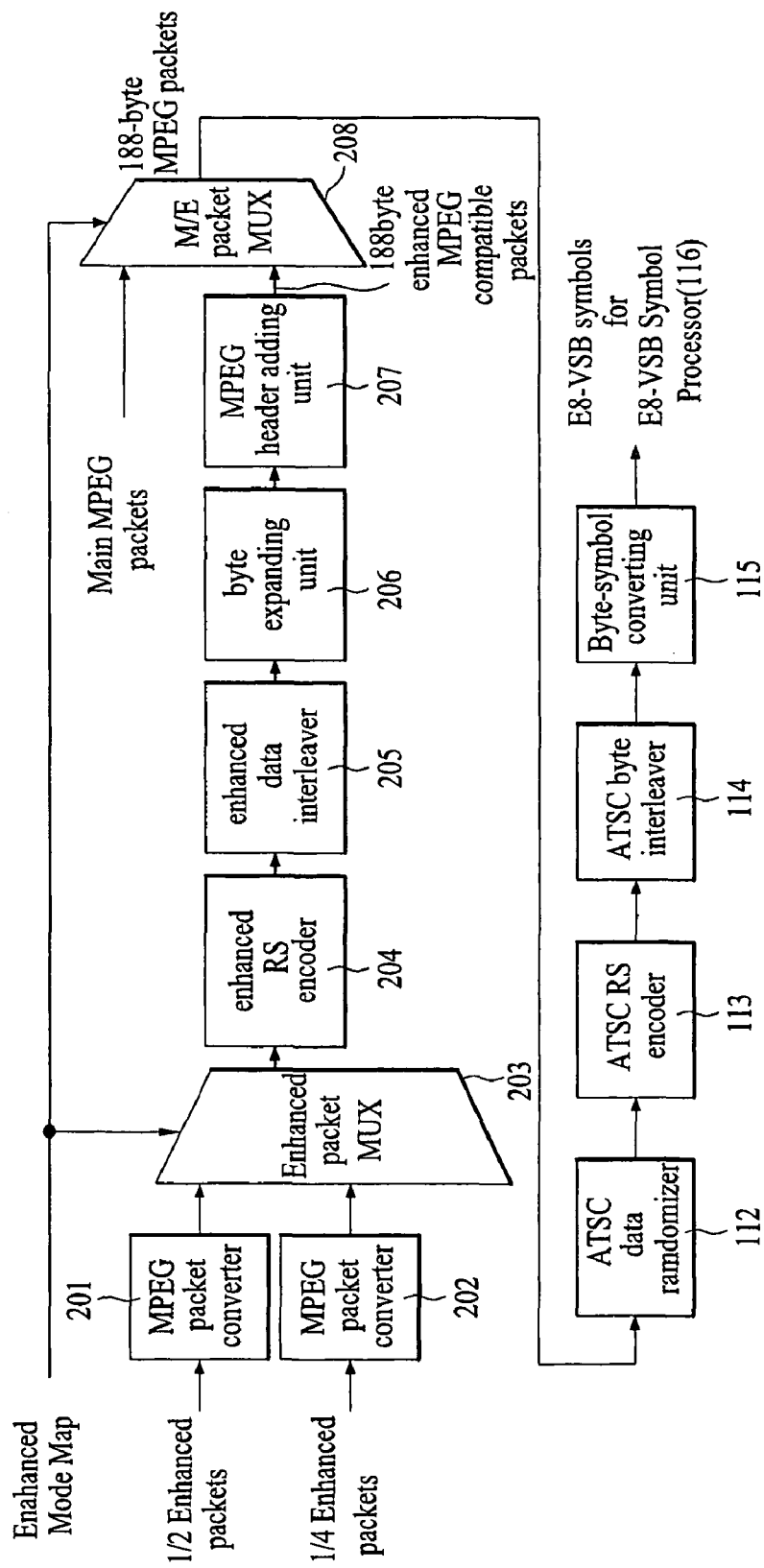
FIG. 5B is a block diagram of an E8-VSB transmission system to explain E8-VSB data attribute generation in FIG. 5A.

FIG. 5B is a detailed block diagram of the main and enhanced multiplexing packet processing unit and the channel encoding unit of the E8-VSB transmission system shown in FIG. 1 and FIG. 2 to explain E8-VSB data attribute generation of the present invention.

Referring to FIG. 5B, the enhanced packet multiplexer 203 multiplexes ½ and ¼ enhanced packets into a 164-byte unit packet by enhanced mode map information. Hence, the E8-VSB reception system needs the attribute information indicating whether a current packet is the ½ or ¼ enhanced packet to de-multiplex the multiplexed 164-byte enhanced packet.

The enhanced packet multiplexing unit 501, which receives the enhanced mode map information, in FIG. 5A selects an H-packet flag if the packet inputted to the channel decoder indicates the ½ enhanced packet. If the inputted packet indicates the ¼ enhanced packet, the enhanced packet multiplexing unit 501 selects a Q-packet flag to output as enhanced packet attribute information. This is called an H/Q flag of packet unit.

An enhanced RS encoder 204 in FIG. 5B corresponds to the 184-bit repeater 502 in FIG. 5A. Namely, the enhanced RS encoder 204 receives a 164-byte packet, adds a 20-byte parity to the received packet to generate a 184-byte packet, and then outputs the generated packet to an enhanced data interleaver 205. One 164-byte packet inputted to the enhanced RS encoder 204 has one attribute indicating whether the packet is a ½ enhanced packet or a ¼ enhanced packet. And, the attribute is equivalently valid to the 184-byte packet obtained from performing RS encoding in the RS encoder 204. Hence, the 184-bit repeater 502, which is an attribute generator for the enhanced RS encoder 204, can be implemented in a manner of repeating the enhanced packet (1 bit) inputted from the enhanced packet multiplexer 501 by 184 bits (attribute corresponding to 184 bytes) to output to the bit interleaver 503. Namely, in the 184-bit repeater 502, the H/Q flag of the packet unit is converted to 184 H/Q flags o byte unit.

A part of the attribute generator corresponding to the enhanced data interleaver 205 in FIG. 5B is the bit interleaver 503 shown in FIG. 5A. Namely, the enhanced data interleaver 205 receives one byte and then performs interleaving on the received byte to output one byte. Hence, since one byte has the attribute (½ enhanced byte or ¼ enhanced byte), the bit interleaver 503 having the same configuration of the enhanced data interleaver 205 is required for the attribute generator. Yet, it can be implemented as an interleaver of one bit unit for indicating not data byte input/output but the attribute. Namely, the H/Q flag outputted from the 184-bit repeater 502 is interleaved by the bit interleaver 503.

Figure 6:
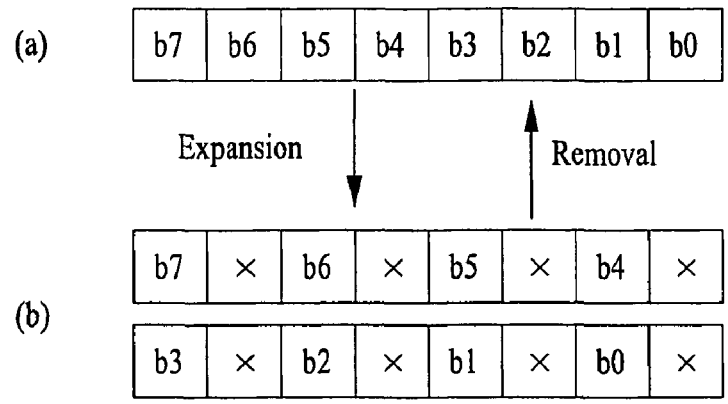
FIG. 6 are diagrams of examples of byte expansion and removal of ½ enhanced data according to the present invention.
Figure 7:
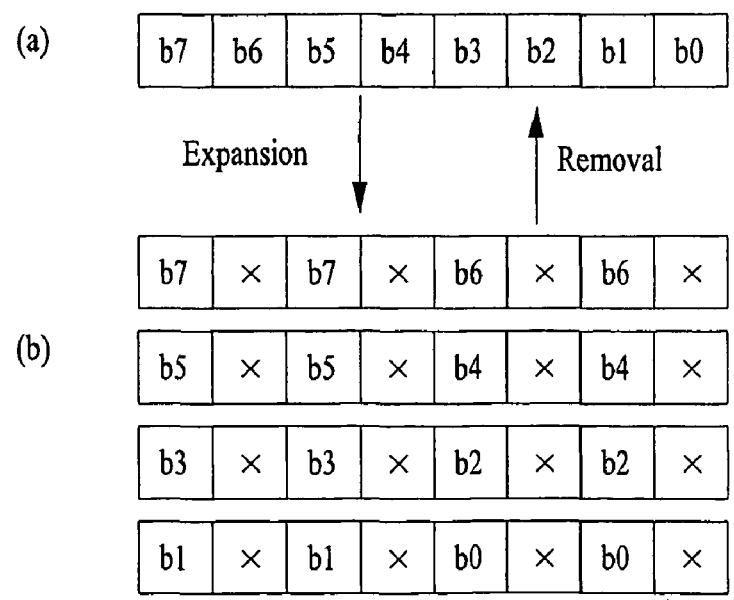
FIG. 7 are diagrams of examples of byte expansion and removal of ¼ enhanced data according to the present invention.

An output of the enhanced data interleaver 205 shown in FIG. 5B is inputted to the byte expanding unit 206. The byte expanding unit 206 expands one byte into two or four bytes, as shown in FIG. 6 and FIG. 7, according to its attribute. Namely, in case of ½ enhanced byte, it is expanded into two bytes as shown in (b) of FIG. 6. In case of ¼ enhanced byte, it is expanded into four bytes as shown in (b) of FIG. 7.

Hence, the E8-VSB reception system should output a byte constructed with significant bits only by receiving an expanded byte and by removing insignificant bits overlapped with null bits to the contrary. In doing so, to identify the ½ and ¼ enhanced bytes from each other, the enhanced byte attribute information is needed. In the present invention, the bit expanding unit 504 shown in FIG. 5A outputs the enhanced byte attribute information. Namely, one bit indicating the attribute of one byte is inputted to the bit expanding unit 504. So, if an input is the ½ enhanced byte, the bit expanding unit 504 expands the attribute corresponding to the ½ enhanced byte into two bits to output. If an input is the ¼ enhanced byte, the bit expanding unit 504 expands the attribute corresponding to the ¼ enhanced byte into four bits to output. Namely, if the H/Q flag outputted from the bit interleaver 503 is the ½ enhanced byte, it is repeated twice. If the H/Q flag outputted from the bit interleaver 503 is the ¼ enhanced byte, it is repeated quadruply.

The enhanced bytes expanded via the byte expanding unit 206 in FIG. 5B are grouped into 184-byte packets to be inputted to the MPEG header adding unit 207. The MPEG header adder unit 207 adds a 4-byte null MPEG header in front of a 184-byte input packet to output a 188-byte MPEG compatible packet.

In other words, the packet outputted from the MPEG header adding unit 207 becomes a 188-byte packet constructed with 4-byte main bytes and 184-byte enhanced bytes. Hence, in the E8-VSB reception system, it is necessary to identify a header of the packet from an enhanced data part of the packet. To identify the main data and the enhanced data from each other, a separate attribute bit is needed. This is called an M/E flag by which the main data and the enhanced data can be identified from each other. So, a main flag adding unit 505 outputs attribute information constructed with two bits. In this case, one of the two bits is the M/E flag while the other is the H/Q flag.

Hence, the main flag adding unit 505 outputs four M-flags instructing the attribute of a 4-byte MPEG header and ads 184 E-flags instructing enhanced data to 184 enhanced byte attribute information H/Q flags inputted from the bit expanding unit 504 to output. Namely, 2-bit attribute information (M/E flag, H/Q flag) is outputted from the main flag adding unit 505 shown in FIG. 5A by byte unit. In doing so, in case of the main data, since the enhanced attribute information is meaningless, a random H/Q flag can be outputted.

The main/enhanced packet multiplexer 208 shown in FIG. 5B multiplexes the main MPEG packet and the enhanced MPEG packet together according to the enhanced mode map information and then outputs the multiplexed information. So, to de-multiplex the multiplexed MPEG packet, the E8-VSB reception system needs the M/E packet attribute information for identifying whether a currently received packet is a main packet or an enhanced packet. Namely, the 188-byte MPEG compatible packet outputted from the MPEG header adding unit 207 is regarded as an enhanced packet overall even if a front 4-byte MPEG header corresponds to the main data.

Hence, the M/E packet multiplexer 506 shown in FIG. 5A generates the M/E packet attribute information in a manner that the main and enhanced packets are multiplexed according to the enhanced mode map information. In a sequence of the main packet, a packet constructed with 188 2-bit flags (M/E flag, H/Q flag) is outputted to the data randomizer 507. In a sequence of the enhanced packet, the M/E packet multiplexer 506 receives the 2-bit attribute packet outputted from the main flag adding unit 505 and then outputs the received packet to the data randomizer 507 as it is. In dong so, as mentioned in the foregoing description of the main flag adding unit 505, since the enhanced attribute information is meaningless in case of the main packet, the main data is indicated by the M/E flag. And, the H/Q flag can output a random value.

Namely, the M/E flag is the information for identifying the front 4-byte main data from the rear 184-byte enhanced data within the enhanced packet. And, the M/E packet attribute information is the information for identifying the 188-byte-unit main data and the enhanced packet from each other.

Meanwhile, the ATSC randomizer 112 shown in FIG. 5B performs a randomizing process on the 187-byte data resulting from excluding an MPEG sync byte from the inputted 188-byte MPEG data and then outputs the randomized data to the ATEX RS encoder 113. In doing so, if the attribute of one byte among the input of the ATSC data randomizer 112 is the ¼ enhanced byte, it is the result of the four bytes expanded by the byte expanding unit 206 shown in (b) of FIG. 7 in a manner of repeating the same bits. Yet, after the input has passed through the ATSC randomizer 112, it is unable to tell that values of the repeated bits are identical.

Figure 8:
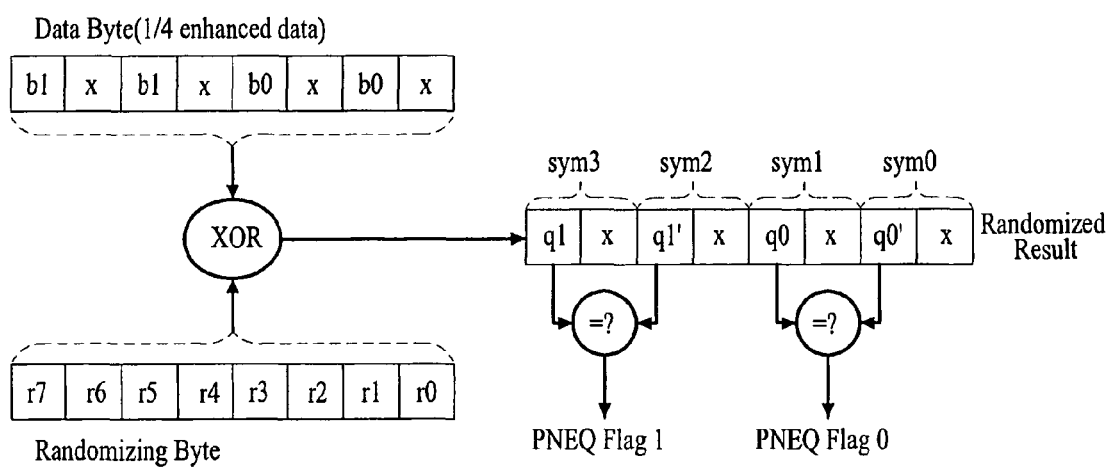
FIG. 8 is a diagram of a process of generating a PNQ flag for a ¼ enhanced byte as one of E8-VSB data attribute information according to the present invention.

FIG. 8 shows a randomizing byte and a result byte obtained from performing XOR on one ¼ enhanced byte. In the ¼ enhanced byte, a bit b1 is twice repeated and a bit b0 is twice repeated. If a bit r7 of the randomizing byte is equal to a bit r5, bits q1 and q1' of a randomized byte shall have a same sign. Yet, if the bit r7 of the randomizing byte is not equal to the bit r5, the bit q1 will have a sign different from that of the bit q1'. Hence, needed is the information indicating whether the bits included in the ¼ enhanced byte are randomized by the same sign between the repeated bits, if the ¼ enhanced byte is inputted to the randomizer. Hence, the data randomizer 507 in FIG. 5A receives the M/E and H/Q flags outputted from the M/E packet multiplexer 506 and outputs them to the flip flag generating unit 509. In case that a current flag is the ¼ enhanced byte, the data randomizer 507 outputs the attribute information (PNEQ Flag) indicating whether two pairs of significant bits repeatedly included in one byte are randomized by the same sign to the flip flag generating unit 509. In this case, the M/E flag is the attribute information indicating whether a received byte is a main byte or an enhanced byte. And, the H/Q flag is the enhanced byte attribute information indicating whether a received byte is a ½ enhanced byte or a ¼ enhanced byte.

Hence, the data randomizer in FIG. 5A outputs total 4-bit attribute information constructed with a 1-bit M/E flag, a 1-bit H/Q flag and a 2-bit PNEQ flag per byte to the flip flag generating unit 509. Namely, the PNEQ flag, as shown in FIG. 8, includes information corresponding to two bits PNEQ Flag1 and PNEQ Flag0 in one byte.

In this case, the 187-byte data having passed through the ATSC data randomizer in FIG. 5B is inputted to the ATSC RS encoder 113. The ATSC RS encoder 113 adds a 20-byte parity to the 187-byte data and then outputs the parity-added data to the ATSC data interleaver 114. In doing so, if a packet inputted to the ATSC RS encoder 113 is the enhanced packet, since the packet is changed into an RS parity resulting from changing and calculating the data again in the E8-VSB symbol processor 116 in FIG. 1, it becomes a factor of inversing a polarity of a next enhanced symbol in the E8-VSB symbol unit. Hence, the flip flag generating unit 508 in FIG. 5A receives the 1-bit M/E flag, 1-bit H/Q flag and 2-bit PNEQ flag of each byte of the 187-byte packet outputted from the data randomizer 507 and then outputs the received flags to the data interleaver 509. And, the flip flag generating unit 508 adds a 20-bit M/E flag, which indicates the 20-byte RS parity is the main byte, to the attribute information. In doing so, since the H/Q or PNEQ flag is meaningless in a 20-byte RS parity section, any value can be outputted. If a packet inputted to the flip flag generating unit 508 is the enhanced packet, since the 20-byte parity can change polarity of the symbol, the flip flag generating unit 508 outputs a flip flag indicating a corresponding time point to the data interleaver 509.

Namely, the flip flag generating unit 508 outputs total four kinds (or total five bits) of attribute information per byte by adding a flip flag 1-bit. Yet, a flip time point, which always corresponds to an ATSC RS parity byte section added to an enhanced packet, has the attribute of main data. And, since the H/Q flag is meaningless in a main data section, the flip flag can share a bit with the H/Q flag. Namely, if the M/E flag indicates the main byte, the 1-bit is used as the flip flag. If it is the enhanced byte, the 1-bit can be used as the H/Q flag.

The ATSC data interleaver 114 shown in FIG. 5B corresponds to the data interleaver 509 shown in FIG. 5A. In this case, the ATSC data interleaver 114 in FIG. 5B receives data of byte unit and then outputs data of byte unit. On the contrary, the data interleaver 509 in FIG. 5A receives the four kinds of attribute informations (M/E flag, H/Q flag, PNEQ flag, flip flag) corresponding to one byte from the flip flag generating unit 508, performs interleaving on the received information, and then outputs the attribute informations.

In doing so, data bytes interleaved by the ATSC data interleaver 114 in FIG. 5B are 12-way-symbol-interleaved by the byte-symbol converter 115 in a manner of dividing one byte into four 2-bit symbols and are then inputted to the E8-VSB symbol processor 116. Hence, the corresponding byte-symbol converting unit 510 in FIG. 5A receives the four kinds of the attribute informations per byte from the data interleaver 509, divides the received informations into symbols, performs 12-way symbol interleaving, and then outputs final E8-VSB symbol attribute information. Namely, the attribute information inputted to the byte-symbol converting unit 510 includes four types (M/E flag, H/Q flag, PNEQ flag, flip flag) per each byte. And, the PNEQ flag among them, as shown in FIG. 8, includes the information corresponding to two bits PNEQ flag1 and PNEQ Flag0 in one byte.

The attributes of the four symbols converted for one byte-unit attribute outputted from the byte-symbol converting unit 510 succeed the byte attribute as it is to have the same M/E, H/Q and flip flags. Yet, the PNEQ flag has the attribute for the PNEQ flag corresponding to a location of its symbol within the byte. Namely, when the byte for the randomized result in FIG. 8 is converted to symbol3, symbol2, symbol1 and symbol0, PNEQ flags of the symbol3 and symbol1 have the vale of PNEQ Flag1 and the PNEQ flag of the symbol1 and symbol0 has the vale of the PNEQ Flag0.

In the above-explained E8-VSB data attribute apparatus in FIG. 5A, the enhanced packet attribute information, the M/E packet attribute information, the E8-VSB symbol attribute information and the enhanced byte attribute information are called the E8-VSB data attribute information for the E8-VSB reception system together.

The E8-VSB data attribute information generated from the E8-VSB data attribute generating apparatus is outputted to the channel equalizing unit and the channel decoder. In particular, the enhanced packet attribute information, outputted from the enhanced packet multiplexer 501 of the E8-VSB data attribute E8-VSB data attribute apparatus, the enhanced byte attribute information outputted from the bit expanding unit 504, the M/E packet attribute information outputted from the M/E packet multiplexer 506, and the E8-VSB symbol attribute information outputted from the byte-symbol converting unit 510 are inputted to the channel equalizing unit and the channel decoder.

Figure 9:
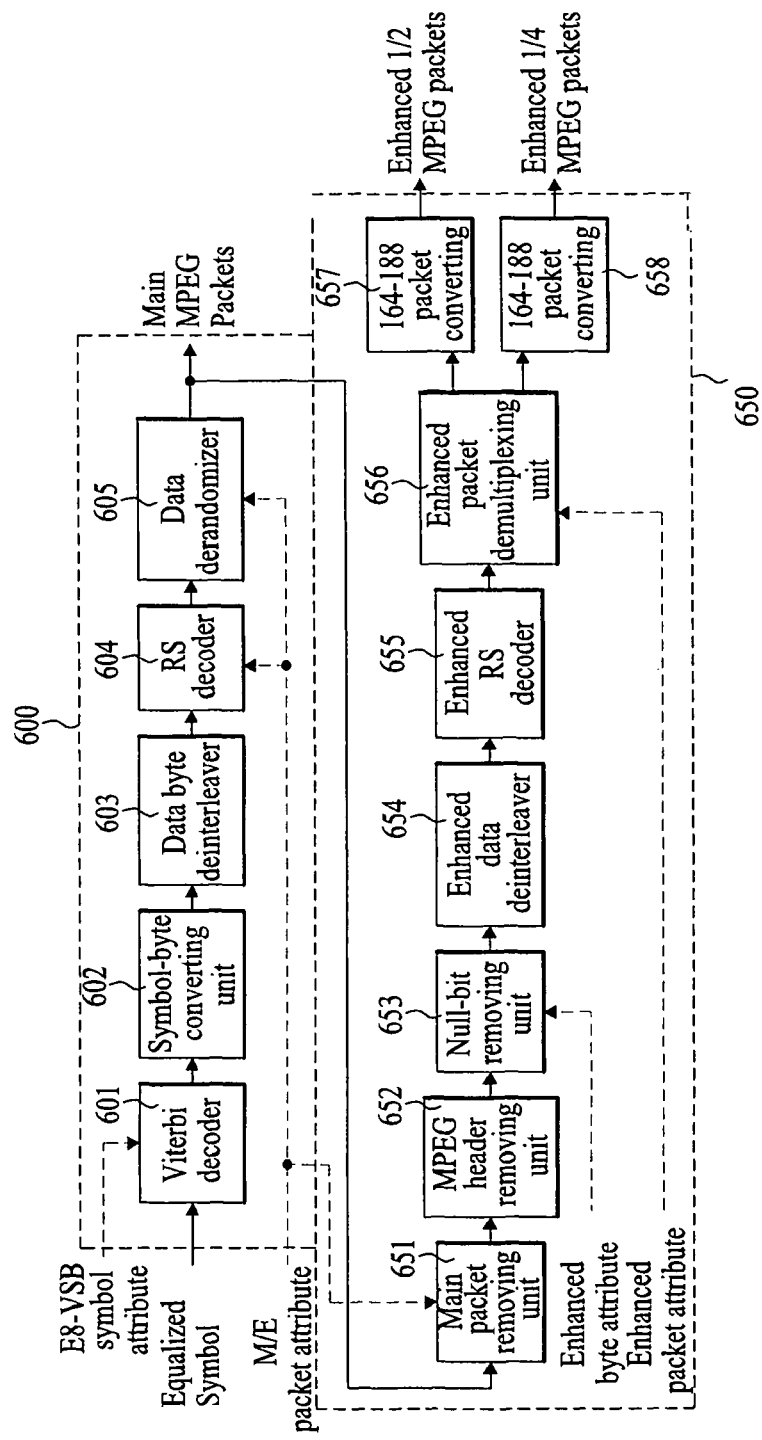
FIG. 9 is a block diagram of an E8-VSB channel decoding apparatus according to a first embodiment of the present invention.

FIG. 9 is a block diagram of a channel decoding apparatus in an E8-VSB reception system according to a first embodiment of the present invention, in which a separate data path for receiving enhanced data as well as main data exists.

Referring to FIG. 9, a channel decoding apparatus in an E8-VSB reception system according to a first embodiment of the present invention includes a main data decoding unit 600 receiving an equalized symbol to decode main data (main MPEG packets) and an enhanced data decoding unit 650 separating enhanced data, decoding the separated data, and separating the decoded data into ½ enhanced data (½ enhanced MPEG packets) and ¼ enhanced data (¼ enhanced MPEG packets).

Namely, the basic configuration of the main data decoding unit 600 is almost as good as the configuration of the conventional 8VSB channel decoder. In case that a symbol inputted to the main data decoding unit 600 is a main symbol, the E8-VSB data attribute generating apparatus indicates the main symbol via E8-VSB data attribute information. Hence, the main data decoding unit 600 can receive the main symbol along a path of the conventional 8VSB channel decoder.

Since the main data and the enhanced data are multiplexed in case of the E8-VSB symbol, several changes occur in the channel decoding apparatus. In particular, based on the attribute of the symbol inputted from the Viterbi decoder, Viterbi decoding suitable for each attribute should be carried out. The RS decoder and the de-randomizer need to operate according to the attribute of packet. And, there should exist a separate data path for the enhanced data.

For this, the main data decoding unit 600 sequentially includes an E8-VSB Viterbi decoder 601, a symbol-byte converting unit 602, a data byte de-interleaver 603, an RS decoder 604 and a data de-randomizer 605.

The enhanced data decoding unit 650, which configures a data path for decoding enhanced data, sequentially includes a main packet removing unit 651 receiving an output of the data de-randomizer 605, an MPEG header removing unit 652, a null-bit removing unit 653, an enhanced data de-interleaver 654, an enhanced RS decoder 655, an enhanced packet de-multiplexing unit 656 and a pair of 164-to-188 packet converting units 657 and 658.

Namely, in the channel decoding apparatus of the E8-VSB reception system in FIG. 9, main data, ½ enhanced data and ¼ enhanced data can be entirely decoded and de-multiplexed.

In this case, the M/E packet attribute information generated from the E8-VSB data attribute generating apparatus is inputted to the RS decoder 604, the data de-randomizer 605 and the main packet removing unit 651 to identify whether a current packet in the RS decoder 604, the data de-randomizer 605 and the main packet removing unit 651 is a main packet or an enhanced packet.

The enhanced packet attribute information is inputted to the enhanced packet de-multiplexing unit 656 so that the enhanced packet de-multiplexing unit 656 can de-multiplex a current enhanced packet by identifying whether the current enhanced packet is the ½ enhanced packet or the ¼ enhanced packet.

The enhanced byte attribute information is inputted to the null-bit removing unit 654. Hence, the null-bit removing unit 654 can configure an enhanced byte including significant bits only by identifying whether an inputted byte is a ½ enhanced byte or a ¼ enhanced byte and by removing insignificant bits.

The E8-VSB symbol attribute information is inputted to the E8-VSB Viterbi decoder 601 so that an inputted symbol can be decoded by the E8-VSB Viterbi decoder 601. The E8-VSB symbol attribute information includes attribute information (M/E flag) indicating whether each symbol is a main symbol or an enhanced symbol, attribute information (H/Q flag) indicating whether the enhanced symbol is ½ enhanced symbol or ¼ enhanced symbol in case of the enhanced symbol, attribute information (flip flag) indicating whether polarity of an enhanced symbol following a current symbol can be changed, and attribute information (PNEQ Flag) indicating whether signs of repeated symbols are equal to each other in case of the ¼ enhanced symbol.

An operation of the above-configured channel decoding apparatus according to the first embodiment of the present invention is explained as follows. In this case, the channel decoding apparatus is applied to the E8-VSB reception system shown in FIG. 4 for example.

First of all, the E8-VSB symbol equalized by the channel equalizing unit 406 and the E8-VSB symbol attribute information, as shown in FIG. 5A, generated from the E8-VSB data attribute generating unit 405 are synchronized with each other to be inputted to the E8-VSB Viterbi decoder 601.

In doing so, since main and enhanced symbols are mixed in the equalized symbols inputted to the E8-VSB Viterbi decoder 601, the E8-VSB Viterbi decoder 601 identifies the main symbol from the enhanced symbol according to the E8-VSB symbol attribute information and then performs Viterbi decoding according to the identified symbol attribute. In this case, a value decided in the Viterbi decoding process by the E8-VSB Viterbi decoder 601 is fed back to the channel equalizing unit 406.

The symbol Viterbi-decoded by the E8-VSB Viterbi decoder is inputted to the symbol-byte converting unit 602 to be converted to byte-unit data after completion of 12-way de-interleaving. The converted byte-unit data is inputted to the data byte de-interleaver 603 to be outputted as packet-unit data after completion of de-interleaving. The packet data outputted from the data byte de-interleaver 603 is then inputted to the RS decoder 604.

The RS decoder 604 receives a 207-byte-unit packet constructed with the de-interleaved data and the M/E packet attribute information. If a current packet is the main packet, the RS decoder 604 performs decoding. If a current packet is the enhanced packet, the RS decoder 604 removes the RS parity byte and then outputs the corresponding 187-byte data packet to the data de-randomizer 605. Namely, by the M/E attribute information, it can be known whether the current packet is the main packet or the enhanced packet.

The data de-randomizer 605 performs de-randomizing on the 187-byte-unit data packet and then adds an MPEG sync byte to the de-randomized packet to output a 188-byte MPEG packet (main MPEG packets).

In doing so, in case of the enhanced packet, the data de-randomizer 605 can replace the MPEG header added to the de-randomized data by the E8-VSB transmission system by a header having a null-packet PID to output the null-packet PID added packet. This is because a header value of the enhanced packet is previously known even if error occurs in the received MPEG header data during the transmission process. Hence, by replacing the header value in the E8-VSB reception system, it is able to avoid the error.

For this, the data de-randomizer 605 receives the M/E packet attribute information from the E8-VSB data attribute generating apparatus to identify the main packet and the enhanced packet.

The 188-byte-unit MPEG packet outputted from the data de-randomizer 605 includes the main and enhanced packets transmitted from the E8-VSB transmission system. In case of the enhanced packet, since the packet has the null MPEG header, it is ignored by the MPEG decoder. And, it may happen that the main packet is handled only.

For the correct decoding of the enhanced packet, the 188-byte-unit MPEG packet outputted from the data de-randomizer 605 is inputted to the main packet removing unit 651 of the enhanced data decoding unit 650 as well.

The main packet removing unit 651 removes the main packet from the inputted 188-byte-unit MPEG packet using the M/E packet attribute information and selects the enhanced packet only to output to the MPEG header removing unit 652. The MPEG header removing unit 652 removes a 4-byte header located at a most front side from the inputted 188-byte-unit enhanced packet and then outputs a 184-byte-unit data packet to the null-bit removing unit 653.

The null-bit removing unit 653 identifies whether the byte outputted from the MPEG header removing unit 652 is the ½ enhanced byte or a ¼ enhanced byte using the enhanced byte attribute information. According to the identified enhanced byte, by removing the insignificant bits, as shown in FIG. 6 and FIG. 7, the null-bit removing unit 653 outputs the data byte constructed with the significant bits only to the enhanced data de-interleaver 654. Namely, in case of the ½ enhanced byte, the null-bit removing unit 653 removes the null bit to output two bytes as one byte. In case of the ¼ enhanced byte, the null-bit removing unit 653 removes the repeated bits and null bits to output four bytes as one byte.

The enhanced data de-interleaver 654 performs de-interleaving on the null-bit-removed byte by a byte unit and then configures a 184-byte-unit packet to output to the enhanced RS decoder 655.

The enhanced RS decoder 655 carries out enhanced RS decoding on the 184-byte-unit data packet and then outputs a 164-byte-unit enhanced packet to the enhanced packet de-multiplexing unit 656.

The enhanced packet de-multiplexing unit 656 separates the enhanced-RS-decoded data into a 164-byte-unit ½ enhanced data packet and a ¼ enhanced data packet using the enhanced packet attribute information. The separated ½ enhanced data packet is outputted to the first packet converting unit 657 and the separated ¼ enhanced data packet is outputted to the second packet converting unit 658.

The first packet converting unit 657 matches a synchronization of the ½ enhanced data packet inputted as the 164-byte-unit packet using the MPEG sync byte included in data and then divides it into 188-byte-unit ½ enhanced data packets to output without data alteration (½ enhanced MPEG packets). The second packet converting unit 658 matches a synchronization of the ¼ enhanced data packet inputted as the 164-byte-unit packet using the MPEG sync byte included in data and then outputs 188-byte-unit ¼ enhanced data packets without data alteration (¼ enhanced MPEG packets).

Figure 10:
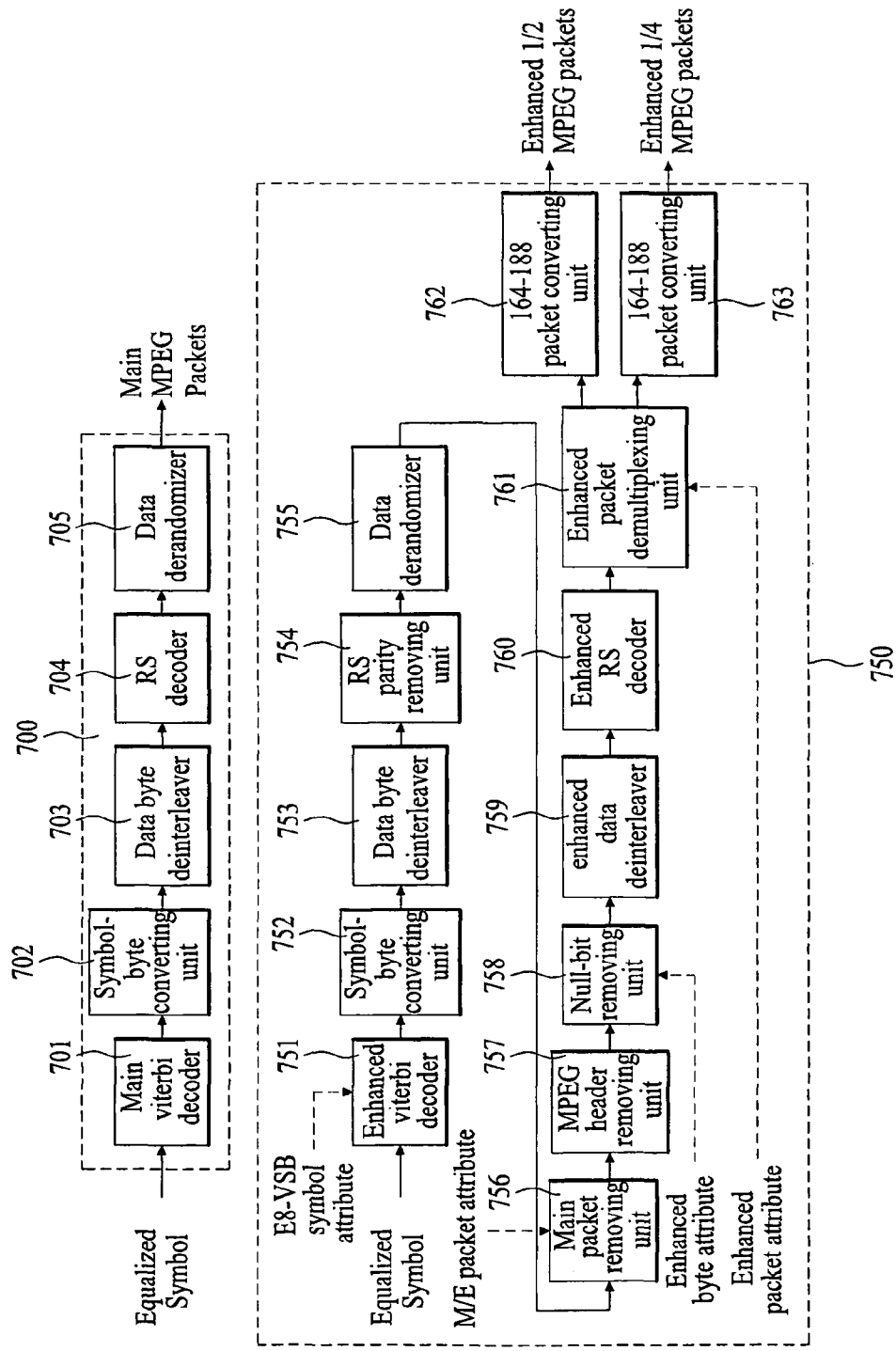
FIG. 10 is a block diagram of an E8-VSB channel decoding apparatus according to a second embodiment of the present invention.

FIG. 10 is a block diagram of an E8-VSB channel decoding apparatus according to a second embodiment of the present invention, which differs from the first embodiment of the present invention in that a channel decoding process of main data is separated from that of enhanced data to be independently carried out.

Referring to FIG. 10, a channel decoding apparatus according to a second embodiment of the present invention includes a main data dedicated decoding unit 700 and an enhanced data dedicated decoding unit 750.

In this case, the main data dedicated decoding unit 700 is identical to the channel decoder used in the conventional ATSC 8VSB receiver and regards all equalized input symbols as main symbols in performing channel decoding.

In particular, for a data path of decoding equalized symbols into main data, the main data dedicated decoding unit 700 sequentially includes a main dedicated Viterbi decoder 701, a symbol-byte converting unit 702, a data byte de-interleaver 703, an RS decoder 704 and a data de-randomizer 705. And, the main data dedicated decoding unit 700 outputs channel-decoded main MPEG packets.

For a data path of decoding equalized symbols into enhanced data, the enhanced data dedicated decoding unit 750 sequentially includes an enhanced dedicated Viterbi decoder 751, a symbol-byte converting unit 752, a data byte de-interleaver 753, an RS parity removing unit 754, a data de-randomizer 755, a main packet removing unit 756, an MPEG header removing unit 757, a null-bit removing unit 758, an enhanced data de-interleaver 759, an enhanced RS decoder 760, an enhanced packet de-multiplexing unit 761 and a pair of 164-to-188 packet converting units 762 and 763. And, the enhanced data dedicated decoding unit 750 outputs channel-decoded ½ enhanced MPEG packets and channel-decoded ¼ enhanced MPEG packets.

In this case, the enhanced data dedicated decoding unit 750 receives the enhanced packet attribute information, enhanced byte attribute information, M/E packet attribute information and E8-VSB symbol attribute information generated from the E8-VSB data attribute generating apparatus shown in FIG. 5A.

Namely, the M/E packet attribute information is inputted to the main packet removing unit 756 to enable the main packet removing unit 756 to identify whether a current packet is a main packet or an enhanced packet.

The enhanced packet attribute information is inputted to the enhanced packet de-multiplexing unit 761 so that the enhanced packet de-multiplexing unit 761 can de-multiplex a current enhanced packet by identifying whether the current enhanced packet is the ½ enhanced packet or the ¼ enhanced packet.

The enhanced byte attribute information is inputted to the null-bit removing unit 758. Hence, the null-bit removing unit 758 can configure an enhanced byte including significant bits only by identifying whether an inputted byte is a ½ enhanced byte or a ¼ enhanced byte and by removing insignificant bits.

The E8-VSB symbol attribute information is inputted to the enhanced dedicated E8-VSB Viterbi decoder 751 so that an inputted symbol can be decoded to be suitable for symbol attribute by the enhanced dedicated E8-VSB Viterbi decoder 751.

The above-configured enhanced data dedicated decoding unit 750 receives the equalized E8-VSB symbol and the attribute information of the symbol to decode the enhanced symbol only. Namely, if the enhanced symbol is decoded without decoding the main symbol, it is able to minimize the performance degradation caused to the enhanced symbol by the main symbol. Hence, the decoding performance of the enhanced symbol can be maximized.

In this case, a handling process after the output of the enhanced dedicated Viterbi decoder 751 is almost identical to that of the first embodiment of the present invention, which is skipped in the following description. Yet, the second embodiment of the present invention differs from the first embodiment of the present invention in that the RS parity removing unit 754 is used instead of the RS decoder. This is because the enhanced dedicated data decoder 751 does not decode the main packet.

In the second embodiment of the present invention, the data de-randomizer 755 can output the de-randomized data having the null-packet ID instead of the MPEG header added by the E8-VSB transmission system.

Meanwhile, in the configuration of the enhanced data dedicated decoder 750 shown in FIG. 10, the E8-VSB symbol is constructed with two bits. In case of the enhanced symbol, significant information is located at upper bits only. Hence, in configuring a byte in the symbol-byte converting unit 752, it is able to configure the byte that excludes lower bits. Namely, outputted is not 8-bit byte but 4-bit byte. This means that a size of a memory necessary for the implementation of the data byte de-interleaver 753 can be reduced to half. In an operation of the data de-randomizer 755, data de-randomizing is carried out using r7, r5, r3 and r1 of the randomizing bytes shown in FIG. 8.

Since the null-bits (lower bits configuring a symbol) was already removed in the symbol-byte converting unit 752, the null-bit removing unit 758 configures one significant ½ enhanced byte by collecting two inputs if the inputted byte is the ½ enhanced byte. If the inputted byte is the ¼ enhanced byte, the null-bit removing unit 758 configures one significant ¼ enhanced byte by removing one of the repeated bits and by collecting four of them.

Figure 11:
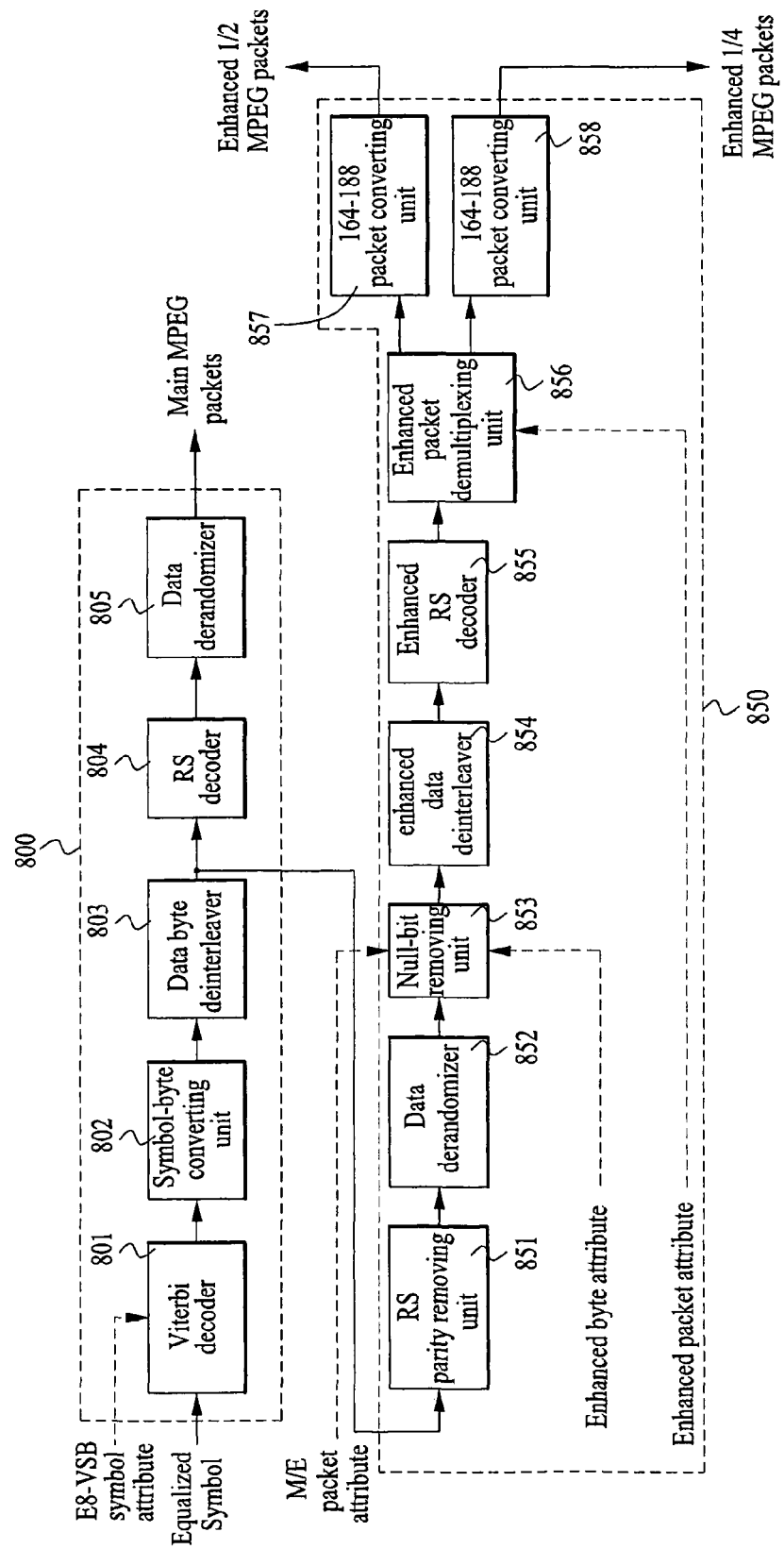
FIG. 11 is a block diagram of an E8-VSB channel decoding apparatus according to a third embodiment of the present invention.

FIG. 11 is a block diagram of an E8-VSB channel decoding apparatus according to a third embodiment of the present invention.

Referring to FIG. 11, a channel decoding apparatus in an E8-VSB reception system according to a third embodiment of the present invention includes a main data decoding unit 800 receiving an equalized symbol to perform channel decoding and an enhanced data decoding unit 850 separating enhanced data, decoding the separated data, and separating the decoded data into ½ enhanced data and ¼ enhanced data.

The main data decoding unit 800 sequentially includes an E8-VSB Viterbi decoder 801, a symbol-byte converting unit 802, a data byte de-interleaver 803, an RS decoder 804 and a data de-randomizer 805. And, the main data decoding unit 800 outputs channel-decoded main MPEG packets.

And, the enhanced data decoding unit 850 sequentially includes an RS parity removing unit 851 receiving an output of the data byte de-interleaver 803, a data de-randomizer 852, a null-bit removing unit 853, an enhanced data de-interleaver 854, an enhanced RS decoder 8550, an enhanced packet de-multiplexing unit 856 and a pair of 164-to-188 packet converting units 857 and 858. And, the enhanced data decoding unit 850 outputs channel-decoded ½ enhanced MPEG packet data (½ enhanced MPEG packets) and channel decoded ¼ enhanced MPEG packet data (¼ enhanced MPEG packets).

The above-configured channel decoding apparatus according to the third embodiment of the present invention differs from that of the first embodiment of the present invention in that the data decoding unit 850 receives the output of the data byte de-interleaver 803 to decode the enhanced data. And, the null-bit removing unit 853 configures the enhanced data constructed with significant bits only by removing the main packet using the M/E packet attribute information and by removing insignificant bits from the byte within the enhanced packet using the enhanced byte attribute information.

In this case, the main and enhanced data decoding units 800 and 850 receive the enhanced packet attribute information, enhanced byte attribute information, M/E packet attribute information and E8-VSB symbol attribute information generated from the E8-VSB data attribute generating apparatus shown in FIG. 5A.

Namely, the M/E packet attribute information is inputted to the null-bit removing unit 853 to enable the null-bit removing unit 853 to remove the main packet by identifying whether a current packet is a main packet or an enhanced packet and to configure the enhanced byte constructed with significant bits only by removing insignificant bits in a manner of identifying whether the byte within the enhanced packet is the ½ enhanced byte or the ¼ enhanced byte.

The enhanced packet attribute information is inputted to the enhanced packet de-multiplexing unit 856 so that the enhanced packet de-multiplexing unit 856 can de-multiplex a current enhanced packet by identifying whether the current enhanced packet is the ½ enhanced packet or the ¼ enhanced packet.

The E8-VSB symbol attribute information is inputted to the E8-VSB Viterbi decoder 801 so that an inputted symbol can be decoded to be suitable for E8-VSB symbol attribute by the E8-VSB Viterbi decoder 801.

A value decided in the Viterbi decoding process by the E8-VSB Viterbi decoder 801 is fed back to the channel equalizing unit 406.

The symbol Viterbi-decoded by the E8-VSB Viterbi decoder 801 is inputted to the symbol-byte converting unit 802 to be converted to byte-unit data after completion of 12-way de-interleaving. The converted byte-unit data is inputted to the data byte de-interleaver 803 to be outputted as packet-unit data after completion of de-interleaving.

The packet data outputted from the data byte de-interleaver 803 is then inputted to the RS decoder 804 and the RS parity removing unit 851 of the enhanced data decoding unit 850.

The RS decoder 804 performs RE decoding on the data packet outputted from the data byte de-interleaver 803 to output a 187-byte data packet to the data de-randomizer 805. The data de-randomizer 805 performs de-randomizing on the 187-byte-unit data packet, adds an MPEG sync byte to the de-randomized packet, and then outputs 188-byte MPEG packets (main MPEG packets). Although the main packet and the enhanced packet are included in the MPEG packet outputted from the data de-randomizer 805, the enhanced packet having the null MPEG header is ignored by the main data MPEG decoder.

Meanwhile, the RS parity removing unit 851 of the enhanced data decoding unit 850 removes the RS parity byte from a 207-byte-unit packet data outputted from the data byte de-interleaver 803 and then outputs a 187-byte-unit data packet to the data de-randomizer 852. The data de-randomizer 852 performs de-randomizing on the 187-byte-unit data packet, adds an MPEG sync byte to the de-randomized packet, and then outputs a 188-byte data packet to the null-bit removing unit 853.

The null-bit removing unit 853 identifies whether the 188-byte data packet outputted from the data de-randomizer 852 is the main packet or the enhanced packet using the M/E packet attribute information. If it is the main packet, the main packet is discarded. If it is the enhanced packet, the null-bit removing unit 853 discards front 4-byte data corresponding to the main data, identifies whether the byte within the enhanced packet is the ½ enhanced byte or the ¼ enhanced byte using the enhanced byte attribute information, removes corresponding insignificant bits, reconfigures the data with significant bits, and then outputs the reconfigured data to the enhanced data interleaver 854.

Subsequent steps are equivalent to those of the first embodiment of the present invention, of which detailed explanations are skipped in the following description.

Meanwhile, the terminologies used in the description of the present invention are defined by considering functions in the present invention and can be varies according to the intentions of those skilled in the art or usages. Hence, the definitions should be taken into consideration based on the overall contents of the present invention.

Accordingly, the E8-VSB reception system, apparatus for generating data attributes and method thereof, and apparatus for channel decoding and method thereof according to the present invention provide the following effects or advantages.

First of all, in the channel decoding apparatus of the new E8-VSB reception system compatible with the conventional ATSC 8VSB system, the main data, ½ enhanced data and ¼ enhanced data can be decoded.

Secondly, as the E8-VSB data attribute generating apparatus generates the attribute information about the E8-VSB data, the channel decoding apparatus can identify the main data, the ½ enhanced data and the ¼ enhanced data from one another. And, by using the attribute information in channel equalization, the performance of the equalizer can be enhanced. Hence, the performance of the E8-VSB reception system can be enhanced.

In doing so, the E8-VSB data attribute generating apparatus generates the M/E packet attribute information enabling the main and enhanced packets to be identified from each other and the enhanced packet attribute information enabling the enhanced packet to be identified as the ½ or ¼ enhanced packet. And, the E8-VSB data attribute generating apparatus generates the enhanced byte attribute information enabling the byte within the enhanced packet to be identified as the ½ or ¼ enhanced byte and the E8-VSB symbol attribute information enabling the data attribute to be identified by symbol unit. The E8-VSB symbol attribute information includes the attribute information indicating whether each symbol is the main or enhanced symbol, the attribute information indicating whether the enhanced symbol is the ½ or ¼ enhanced symbol in case of the enhanced symbol, the attribute information indicating whether a polarity of an enhanced symbol next to a current symbol can be changed, and the attribute information indicating whether signs of the repeated symbols are equal to each other in case of the ¼ enhanced symbol.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A broadcasting transmitter comprising:
    a randomizer for randomizing enhanced data;
    a first Reed Solomon (RS) encoder for generating first RS-encoded enhanced data by first RS encoding the enhanced data;
    a convolutional encoder for generating convolutional-encoded enhanced data symbols by convolutional encoding the first RS-encoded enhanced data and outputting the convolutional-encoded enhanced data symbols;
    a symbol-to-byte converter for generating converted enhanced data by converting the convolutional-encoded enhanced data symbols into byte units;
    a deinterleaver for generating deinterleaved enhanced data by deinterleaving the converted enhanced data in byte units;
    a second RS encoder for generating second RS-encoded enhanced data by second RS encoding the deinterleaved enhanced data;
    an interleaver for generating interleaved enhanced data by interleaving the second RS-encoded enhanced data;
    a trellis encoder for generating trellis-encoded enhanced data by trellis-encoding the interleaved enhanced data; and
    a first multiplexer for multiplexing the trellis-encoded enhanced data with segment synchronization data and field synchronization data.

2. The broadcasting transmitter of claim 1, further comprising:
    a packet generator for generating enhanced data packets including the enhanced data and MPEG header data.

3. The broadcasting transmitter of claim 2, further comprising:
    a second multiplexer for multiplexing the enhanced data packets with main data packets including main data.

4. The broadcasting transmitter of claim 3, wherein the main data are not convolutionally encoded.

5. The broadcasting transmitter of claim 1, wherein the trellis encoder encodes the interleaved enhanced data at a 1/X coding rate or a 1/Y coding rate, wherein X and Y are not the same.

6. The broadcasting transmitter of claim 5, wherein a value of X is 2 and a value of Y is 4.

7. A method of processing broadcast data in a broadcasting transmitter, the method comprising:

randomizing, by a randomizer, enhanced data;

first RS encoding, by a first RS encoder, the enhanced data to generate first RS-encoded enhanced data;

convolutional encoding, by a convolutional encoder, the first RS-encoded enhanced data and outputting convolutional-encoded enhanced data symbols;

converting, by a symbol-to-byte converter, the convolutional-encoded enhanced data symbols into byte units to generate converted enhanced data;

deinterleaving, by a deinterleaver, the converted enhanced data to generate deinterleaved enhanced data;

second RS encoding, by a second RS encoder, the deinterleaved enhanced data to generate second RS-encoded enhanced data;

interleaving, by an interleaver, the second RS-encoded enhanced data to generate interleaved enhanced data;

trellis-encoding, by a trellis encoder, the interleaved enhanced data to generate trellis-encoded enhanced data; and multiplexing the trellis-encoded enhanced data with segment synchronization data and field synchronization data.

8. The method of claim 7, further comprising:

generating enhanced data packets including the enhanced data and MPEG header data.

9. The method of claim 8, further comprising:

multiplexing the enhanced data packets with main data packets including main data.

10. The method of claim 9, wherein the main data are not convolutionally encoded.

11. The method of claim 7, wherein trellis-encoding the interleaved enhanced data comprises encoding at a 1/X coding rate or a 1/Y coding rate, wherein X and Y are not the same.

12. The method of claim 11, wherein a value of X is 2 and a value of Y is 4.

* * * * *